US009781163B2

United States Patent
Todd et al.

(10) Patent No.: US 9,781,163 B2
(45) Date of Patent: Oct. 3, 2017

(54) TRUST OVERLAYS FOR DISAGGREGATED INFRASTRUCTURES

(71) Applicant: EMC Corporation, Hopkinton, MA (US)

(72) Inventors: Stephen Todd, Shrewsbury, MA (US); Kenneth Durazzo, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 174 days.

(21) Appl. No.: 14/747,119

(22) Filed: Jun. 23, 2015

(65) Prior Publication Data

US 2016/0381072 A1 Dec. 29, 2016

(51) Int. Cl.
*H04L 29/06* (2006.01)
*G06F 9/445* (2006.01)
*G06F 21/57* (2013.01)
*G06F 21/62* (2013.01)

(52) U.S. Cl.
CPC .............. *H04L 63/20* (2013.01); *G06F 9/445* (2013.01); *G06F 21/57* (2013.01); *G06F 21/6281* (2013.01)

(58) Field of Classification Search
CPC ....................................................... H04L 63/20
USPC .............................................................. 726/1
See application file for complete search history.

(56) References Cited

U.S. PATENT DOCUMENTS

| | | | |
|---|---|---|---|
| 2011/0296201 A1* | 12/2011 | Monclus ................. | G06F 21/53 713/190 |
| 2012/0159634 A1* | 6/2012 | Haikney ................. | G06F 21/53 726/25 |
| 2014/0082615 A1* | 3/2014 | Kundu ...................... | G06F 8/63 718/1 |
| 2014/0283031 A1* | 9/2014 | Eksten ..................... | G06F 21/51 726/22 |

* cited by examiner

*Primary Examiner* — Jacob Lipman
(74) *Attorney, Agent, or Firm* — Ryan, Mason & Lewis, LLP

(57) ABSTRACT

Trust characteristics attributable to components associated with a disaggregated infrastructure environment are obtained. A trust policy of an application to be hosted in the disaggregated infrastructure environment is obtained. The trust characteristics are compared to the trust policy. One or more of the components associated with the disaggregated infrastructure environment are selected based on the comparison step. A compute node is formed from the selected components.

20 Claims, 7 Drawing Sheets

TRUST OVERLAYS FOR DISAGGREGATED INFRASTRUCTURES

FIELD

The field relates generally to computing infrastructure, and more particularly to computing infrastructure that is formed from disaggregated components.

BACKGROUND

A recent trend in information technology (IT) infrastructure management is the process of selectively grouping multiple, disaggregated IT components into a single, optimized computing package. These disaggregated IT components are typically maintained in groups of resources which are accessed and deployed to form a computing infrastructure upon which an operating system and one or more applications are hosted. The resulting infrastructure may be referred to as a converged infrastructure, a unified infrastructure, a fabric-based infrastructure, a disaggregated infrastructure, or the like.

SUMMARY

Embodiments of the invention provide techniques for forming converged infrastructure, a unified infrastructure, a fabric-based infrastructure, a disaggregated infrastructure, or the like, based on trust characteristics.

For example, in one embodiment, a method comprises the following steps. Trust characteristics attributable to components associated with a disaggregated infrastructure environment are obtained. A trust policy of an application to be hosted in the disaggregated infrastructure environment is obtained. The trust characteristics are compared to the trust policy. One or more of the components associated with the disaggregated infrastructure environment are selected based on the comparison step. A compute node is formed from the selected components.

Advantageously, illustrative embodiments provide for examining an incoming application provisioning request, examining the trust attributes associated with the application, and then provisioning the disaggregated infrastructure appropriately based on available hardware and/or software solutions that satisfy the trust attributes.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units, storage arrays, and devices such as processing devices. It is to be appreciated, however, that embodiments of the invention are not restricted to use with the particular illustrative system and device configurations shown. Moreover, the phrases "cloud infrastructure," "data repository," "data center," "data processing system," "computing system," "computing infrastructure," "data storage system," and the like as used herein are intended to be broadly construed, so as to encompass, for example, private, public or hybrid (part private and part public) cloud computing or storage systems, as well as other types of systems comprising distributed virtual infrastructure. However, a given embodiment may more generally comprise any arrangement of one or more processing devices.

As used herein, the following terms and phrases have the following illustrative meanings: "application" refers to one or more software programs designed to perform one or more functions (e.g., in a data center context, applications are typically tenant defined software programs); "infrastructure" refers to physical and/or virtual resources that make up and/or support an overall IT environment including, but not limited to, computing, storage, and/or network components (including hardware and software implementations); "overlay" refers to software code and/or program(s) that, when loaded (overlaid) on one or more hardware components and executed thereby, performs one or more predefined functions (e.g., in the data center context, overlays typically provide some function to the application or for the application); and "trust" or "trusted" refers to at least one of: satisfying (or at least substantially satisfying) or being consistent with one or more trust-based criteria, e.g., policies, requirements, regulations, security, etc.; possessing one or more trust attributes such as, e.g., retention-capable, encryption, immutability, security, etc., in the case of data; and possessing one or more trust dimensions such as, e.g., availability, recovery, security, etc., in the case of infrastructure. Thus, a "trust overlay" refers to an overlay that is trusted.

Figure 1:
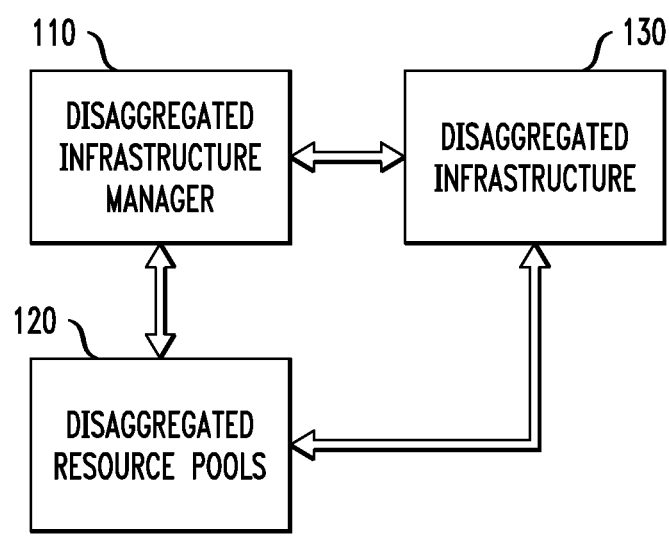
FIG. 1 illustrates a disaggregated infrastructure environment, according to an embodiment of the invention.

As mentioned above, IT computing environments can be constructed and deployed using a disaggregated infrastructure approach. FIG. 1 illustrates a disaggregated infrastructure environment 100 with disaggregated infrastructure manager 110, disaggregated resource pools 120, and disaggregated infrastructure 130. Disaggregated infrastructure manager 110 accesses groups of disaggregated IT components (resources) that are part of disaggregated infrastructure 130 based on some input criteria, e.g., user request, application(s) workload and/or operating system requirements. The manager 110 then allocates the appropriate components as part of resource pools 120 to form a computing infrastructure, i.e., compute node, upon which the operating system and one or more applications are loaded and executed.

Examples of a disaggregated infrastructure environment 100 are described in U.S. patent applications identified as: Ser. No. 14/320,069 filed on Jun. 30, 2014 and entitled "DYNAMICALLY COMPOSED COMPUTE NODES COMPRISING DISAGGREGATED COMPONENTS;" Ser. No. 14/319,889 filed on Jun. 30, 2014 and entitled "SOFTWARE OVERLAYS FOR DISAGGREGATED COMPONENTS;" and Ser. No. 14/584,231 filed on Dec. 29, 2014 and entitled "METHOD AND APPARATUS FOR DISAGGREGATED OVERLAYS VIA APPLICATION SERVICES PROFILES which claims priority to U.S. provisional application identified as Ser. No. 62/054,125 filed on, Sep. 23, 2014 and entitled "METHOD AND APPARATUS FOR DISAGGREGATED OVERLAYS VIA APPLICATION SERVICES PROFILES; the disclosures of which are incorporated by reference herein in their entireties. It is to be understood that trust overlay embodiments of the invention are not limited to use with the disaggregated infrastructure environments described in the above-referenced patent applications, but rather may be applied to other converged infrastructure, unified infrastructure, and/or fabric-based infrastructure environments.

Figure 2A:
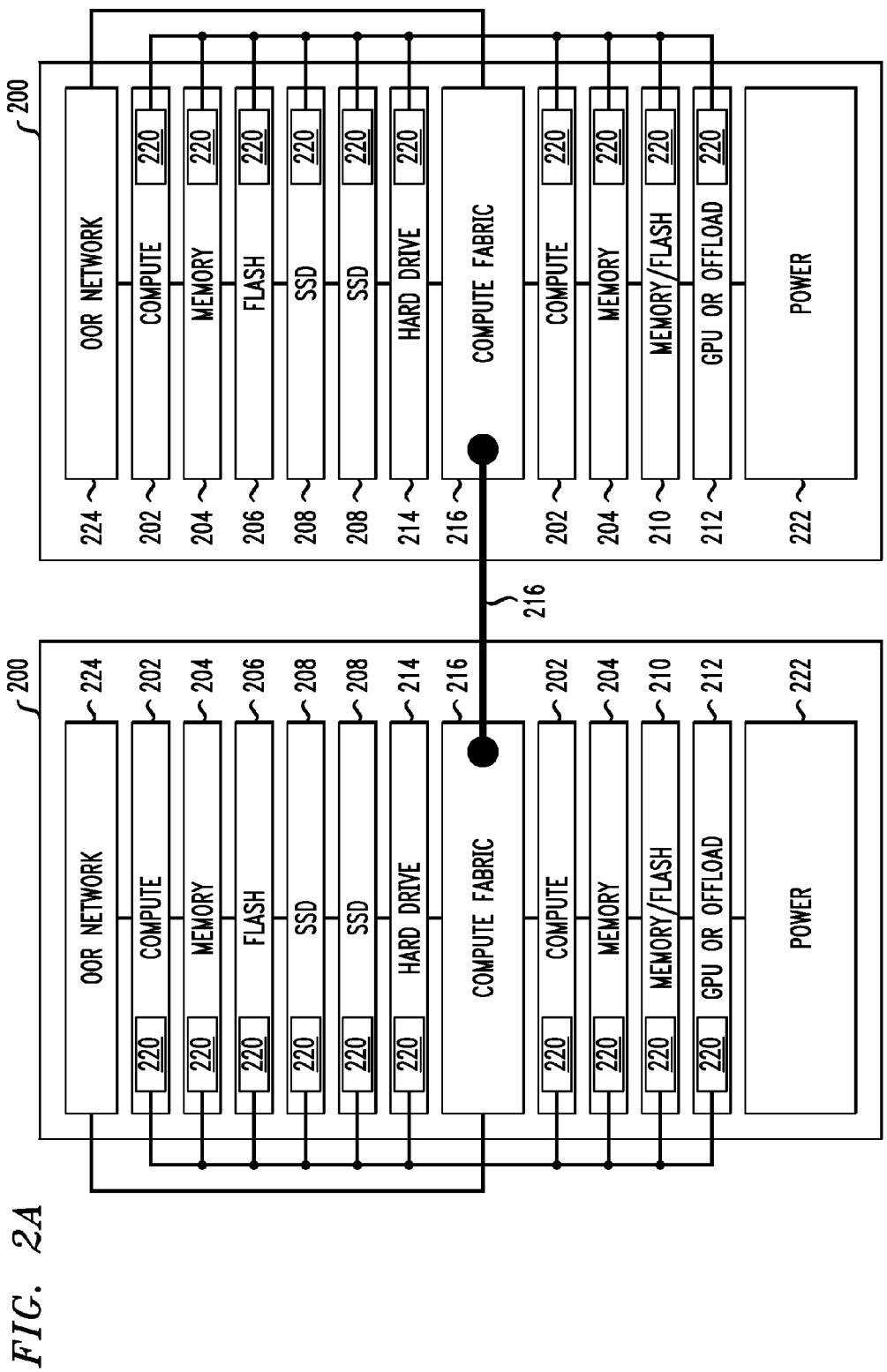
FIG. 2A illustrates an example of disaggregated components, according to an embodiment of the invention.

FIG. 2A illustrates an example of disaggregated components, according to an embodiment of the invention. It is to be understood that hardware components may be disaggregated from their enclosures and combined together into pools of resources. Different components may be dedicated from these pools to specific applications and/or entities to form a dynamically composed compute node, and may be dynamically added or removed from this compute node as needed. This is unlike traditional infrastructures that are typically purpose built for specific applications. This may also be unlike traditional cloud-based services which pool and allocate virtual resources rather than physical resources.

For example, FIG. 2A depicts two separate racks 200 comprising various hardware components. These components include compute components (e.g., processors) 202, memory 204, flash 206, solid state drive ("SSD") 208, flash memory 210, graphics processing unit (GPU) 212, and hard drive 214. These components may be in communication with each other via compute fabric 216, which may be accessed through physical ("phy") interfaces 220. In an embodiment, compute fabric 216 stretches across all the racks in the disaggregated infrastructure. This allows the hardware components to communicate directly with one another via the compute fabric, regardless of whether they are on the same rack. This compute fabric enables east-west ("E-W"), or server-to-server, communication. Racks 200 also include power supplies 222 and out of rack ("OOR") network interface 224.

The components shown in FIG. 2A are provided as a non-limiting example. For example, racks 200 may include additional hardware components that are not depicted. Similarly, racks 200 may comprise fewer components than are depicted. Additionally or alternatively, one rack may be dedicated to a specific type of component while another rack is dedicated to a different type.

Figure 2B:
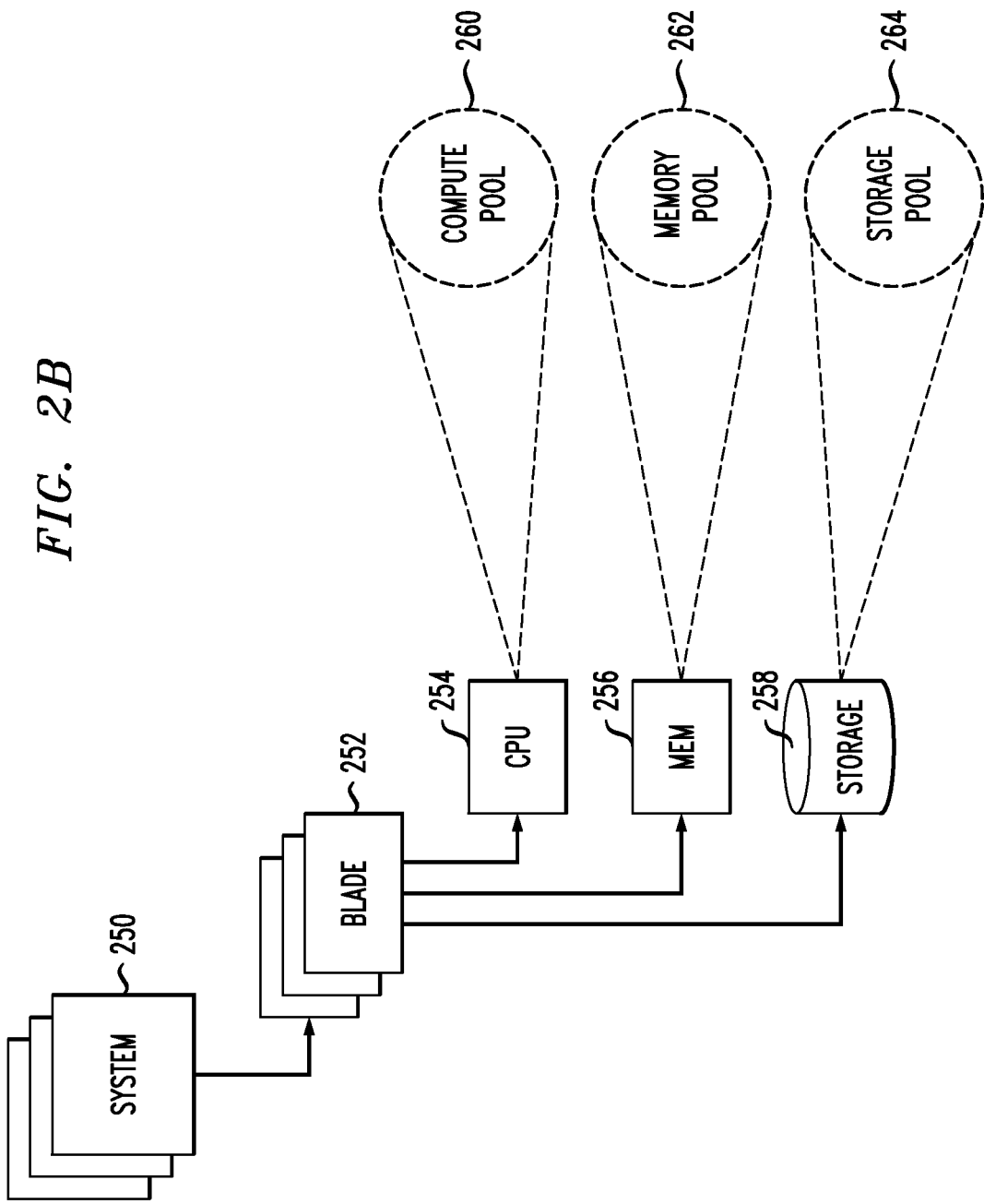
FIG. 2B illustrates an example of construction of a compute node, according to an embodiment of the invention.

FIG. 2B depicts an example embodiment of hardware resources from multiple systems combined into pools. The disaggregated infrastructure may include multiple systems comprising hardware components in communication over a compute fabric, such as compute fabric 216. In an embodiment, systems 250 may be substantially similar to racks 200, and in some embodiments may comprise blade enclosures. Individual systems 250 may comprise one or more blades 252, which include compute ("CPU") resources 254, memory ("MEM") resources 256, and storage resources 258.

CPU 254, MEM 256, and storage 258 may be combined and logically associated with compute pool 260, memory pool 262, and storage pool 264 (collectively, "resource pools"). In an embodiment, these resource pools may include all of the resources of the designated type within the disaggregated infrastructure. For example, compute pool 260 may include every compute resource 254 on every system 250 in the disaggregated infrastructure. Similarly, memory pool 262 may include every memory resource 256 on every system 250 in the disaggregated infrastructure. With reference back to FIG. 2A, for example, each compute component 202 may belong to the same compute pool, and each memory resource 204 may belong to the same memory pool, regardless of which rack 200 those resources are located in. In other words, the disaggregated hardware components spread between multiple systems in the disaggregated infrastructure may be logically associated with a set of resource pools.

The resources may be pooled together based on any common attribute. For example, all the solid state drives may be grouped into a SSD pool, and all the spinning disk resources may be grouped into a spinning disk pool. Similarly, pools may have sub-pools. For example, the storage pool may have an SSD sub-pool and a spinning disk sub-pool.

The disaggregated hardware components associated with the resource pools may be combined to form a new dynamically composed compute node (DCCN). This compute node may comprise one or more dedicated hardware components that may be dynamically allocated to a given task. For example, a user may request resources to install an operating system (OS) comprising a specific software application. That user may be allocated dedicated compute, memory, network, and storage resources from the pools to operate the OS and application.

In some embodiments, resource allocation may be performed by a management utility or service (e.g., implemented via disaggregated infrastructure manager 110). The management utility may have visibility into the systems and resource pools, and may be configured to receive requests from a user. In an embodiment, the management utility resides on a system outside of the disaggregated infrastructure, on a DCCN inside the disaggregated infrastructure, or some combination thereof. The management utility may be configured to perform additional functions.

Figure 3:
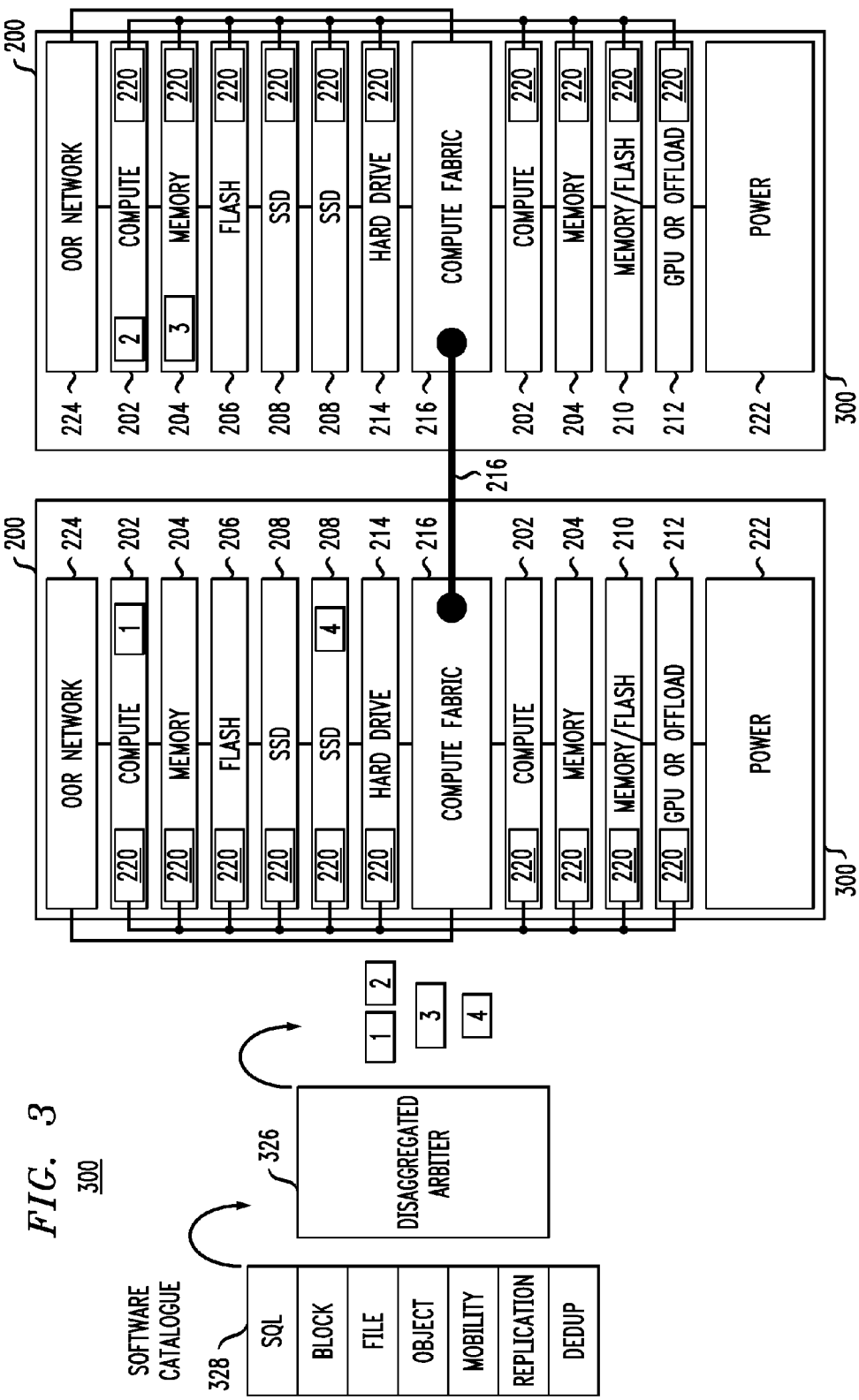
FIG. 3 illustrates an example of a disaggregated arbiter, according to an embodiment of the invention.

Turning now to FIG. 3, a system and process for overlaying application functionality on disaggregated components grouped into a DCCN is described. FIG. 3 may include racks 300 and 301, which may be substantially similar to racks 200 described above. These racks may include disaggregated hardware components, such as compute 202, memory 204, flash 206, solid state drive 208, flash memory 210, and GPU 212. Each of the components may be in communication with compute fabric 216, thereby connecting the components both within and between racks. The communication with compute fabric 216 may be facilitated via physical interfaces, as described above. Compute fabric 216 may also be in communication with OOR network 224.

FIG. 3 also includes disaggregated arbiter 326 and software catalogue 328. Disaggregated arbiter 326 may be a software application used to overly or install software applications on disaggregated hardware components that have been grouped into a DCCN. In an embodiment, disaggregated arbiter 326 is the management utility discussed above (e.g., implemented via disaggregated infrastructure manager 110). Additionally or alternatively, disaggregated arbiter 326 may be a separate software entity that operates independently of the management utility.

Software catalogue 328 may comprise various software offerings that may be installed on a DCCN. The catalog may include operating systems, applications, hypervisors, or any other type of software programs. For example, the software catalogue may include multiple storage software offerings, such as SQL, block, file, or object based storage solutions, or data mobility, replication, or deduplication services. In some embodiments, disaggregated arbiter 326 may add and/or remove software to/from catalogue 328.

In some embodiments, the disaggregated arbiter may receive a workload request identifying software to install on disaggregated hardware components. This software may be chosen from software catalogue 328, and disaggregated arbiter 326 may identify compute resource requirements 1 and 2, memory resource requirement 3, and storage resource requirement 4. Available resources meeting these requirements may be identified in rack 300 or rack 301, and the software may be installed. Once installed, disaggregated arbiter 326 may start the applications or boot the operating systems, and expose them for use.

Figure 4:
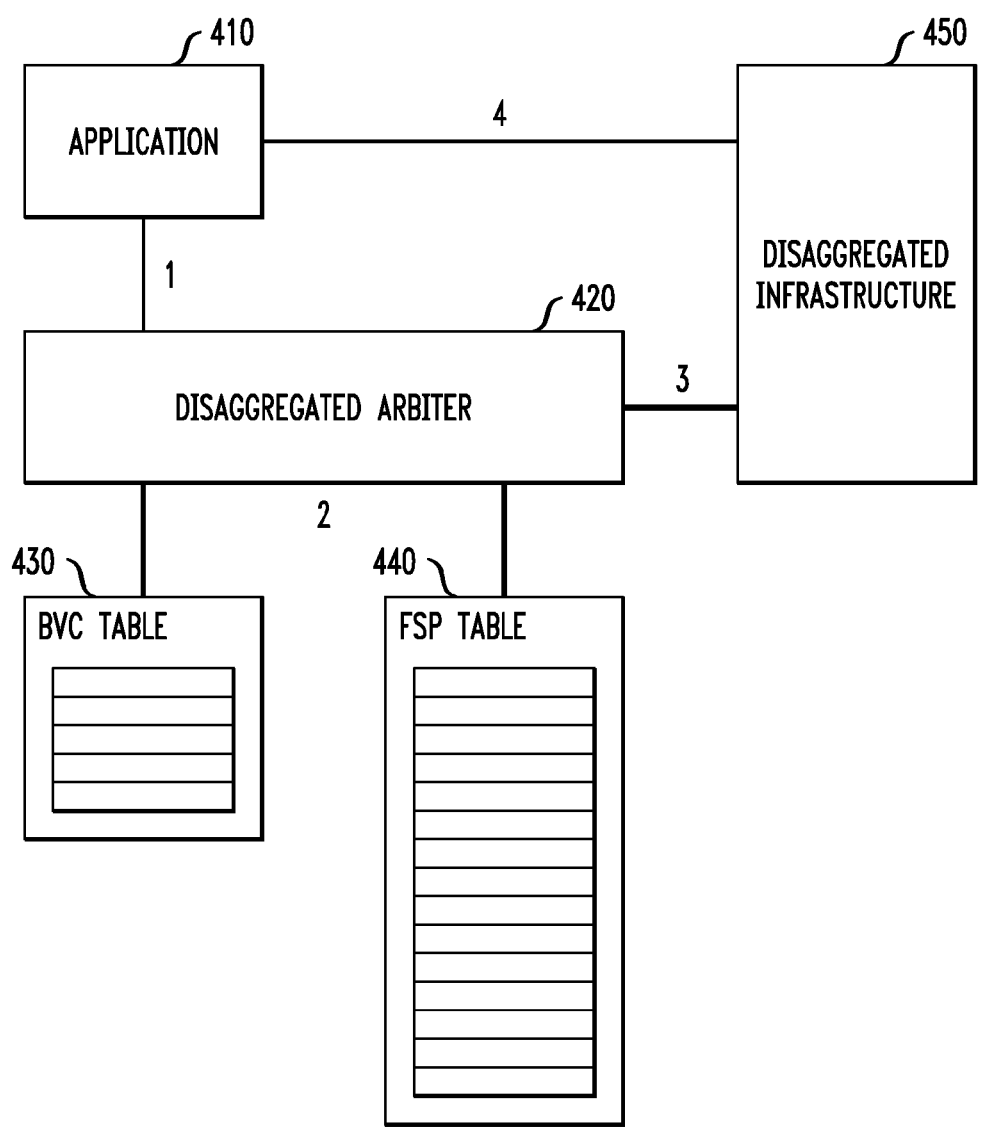
FIG. 4 illustrates an example of use of application profiles to guide a disaggregated arbiter, according to an embodiment of the invention.

FIG. 4 illustrates how to use application profiles to guide a disaggregated arbiter's ability to provide a "best-fit/right-cost" placement onto a disaggregated infrastructure. As shown, system 400 comprises an application 410, a disaggregated arbiter 420, business value chain (BVC) table 430, functional service profile (FSP) table 440, and disaggregated infrastructure 450. Steps 1-4 will now be described in the context of system 400.

In step 1, assume the application 410 requires to be dynamically placed onto a disaggregated infrastructure that does not have a ready location to place it. The application is accompanied by either: a description of where it falls into a business value chain (BVC); or what functional service profiles (FSP) the application is composed of (e.g., message bus, content management repository, etc.).

The disaggregated arbiter 420 can take a generic BVC description, look it up in the BVC table 430 (step 2), and discover which functional service profiles make up a typical application that runs on that element of the BVC. It can then use the elements of the FSP components to discover the CPU, memory, network, and disk demands that these components would place on an IT infrastructure.

These demands are then translated by the arbiter 420 into an appropriately-sized request to allocate the exact amount of CPU, memory, network, and disk from the disaggregated infrastructure 420 (step 3). Once the allocation has occurred, the application 410 can then be placed onto the appropriately-sized disaggregated infrastructure and begin operation (step 4).

Alternatively, in step 1, the application 410 can be accompanied by more granular functional component information that maps directly to the FSP table 440, which bypasses the need to go to the BVC table 430.

Disaggregation, when combined with knowledge about an application's workload needs, allows the disaggregated arbiter to carve out the appropriate amount of physical resources in order to run the application. This approach, however, does not provide for an arbiter to place an application, and its associated data set, on a disaggregated infrastructure that has appropriate security and trust characteristics.

Technologies such as Adaptivity can create an infrastructure taxonomy representing the server, network, and storage needs of an application and data set. It is realized herein that this type of taxonomy can be provided to a disaggregated deployment framework (as described above in the context of FIGS. 1-4) that can search out the best fit, carve out the disaggregated components, and create the proper environment. However, there is no current mechanism to specify trust characteristics that can accompany the infrastructure taxonomy. Examples of such trust characteristics include, but are not limited to: retention and event-based retention; immutability; security; transparency; manageability; sustainability; availability; serviceability; encryption; key management; proof of authenticity (e.g., timestamps and hash codes); electronic shredding; separating/isolating network traffic from other tenants; and separating/isolating memory from other tenants.

Further, there is currently no effective way for a disaggregated infrastructure to extract hardware trust characteristics from banks of CPUs, memory, network, or storage. As described above, a disaggregated arbiter has the ability to overlay software capabilities (e.g., ScaleIO, block functionality, or Atmos object functionality) on top of raw disaggregated components by pulling these software images out of a catalogue. However, there is currently no specified way to poll this catalogue as a way of understanding the trust capabilities that each software image possesses.

It is realized herein that it would be desirable for a disaggregated infrastructure to be able to communicate its overall trust capabilities up to the application layer. This report should advantageously be a combination of the raw hardware capabilities as well as the catalogue-based software capabilities. However, there is currently no logic in existing systems for examining an incoming application provisioning request, examining the trust requirements, and then provisioning the disaggregated infrastructure appropriately based on available hardware and/or software solutions.

Figure 5:
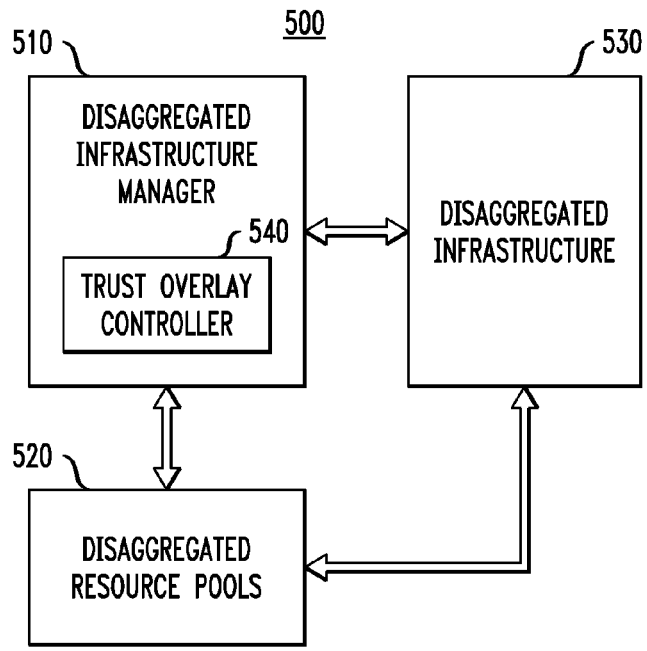
FIG. 5 illustrates a disaggregated infrastructure environment with a trust overlay controller, according to an embodiment of the invention.

Illustrative embodiments of the invention overcome the above and other drawbacks by employing a trust overlay approach to a disaggregated infrastructure environment. FIG. 5 illustrates a disaggregated infrastructure environment 500, according to an illustrative embodiment, with a disaggregated infrastructure manager 510, disaggregated resource pools 520, disaggregated infrastructure 530, and a trust overlay controller 540.

Note that disaggregated infrastructure manager 510 is configured to implement trust overlay controller 540, although controller 540 can alternatively be implemented separate from manager 510. With the exception of trust overlay and associated functionalities, manager 510, resource pools 520, and infrastructure 530 may also have similar functionalities as those described above for manager 110, resource pools 120, and infrastructure 130.

Figure 6:
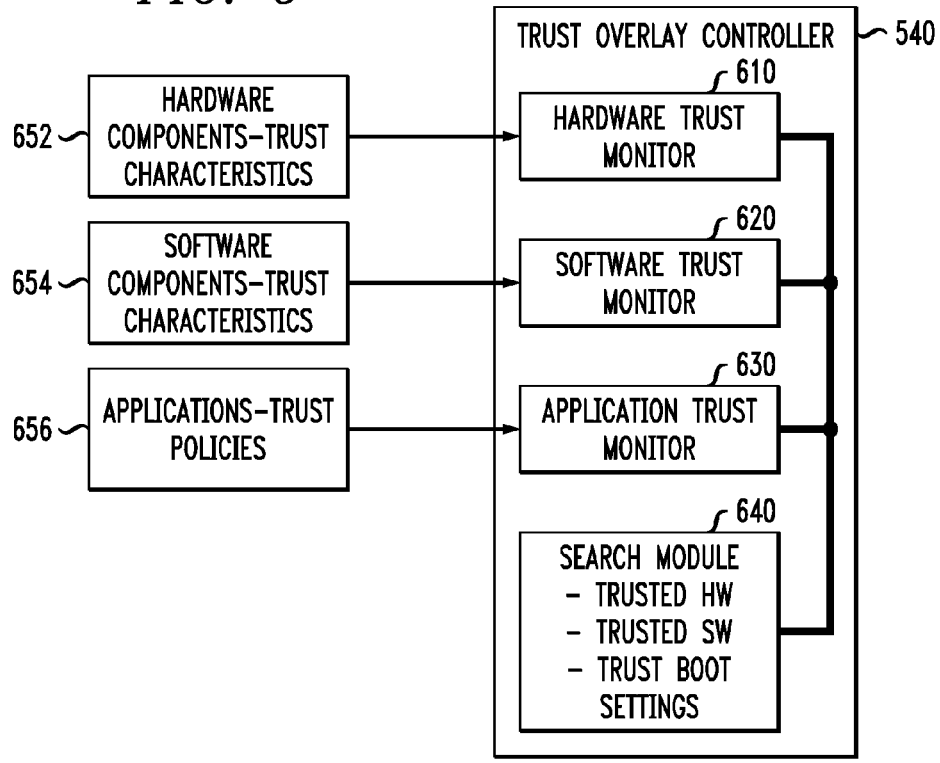
FIG. 6 illustrates a trust overlay controller, according to an embodiment of the invention.

FIG. 6 illustrates a trust overlay controller 540, according to an embodiment of the invention. Trust overlay controller 540 utilizes monitoring and configuration operations to fully leverage trust capabilities in disaggregated hardware and/or software overlays. The trust overlay controller 540 comprises and operatively couples a hardware trust monitor 610, a software trust monitor 620, an application trust monitor 630, and a search module 640. The functions of controller 540 may be implemented with more or less modules than those expressly shown.

Hardware trust monitor 610 is configured to gather (actively requesting them and/or passively receiving them) trust characteristics 652 from the disaggregated hardware components such as CPUs, memory systems, solid state and or disk assemblies (e.g., as illustrated in FIG. 2A).

As described above in the context of FIG. 3, a disaggregated arbiter 326 has access to a set of software assets (catalogue 328) that can be overlaid on top of a disaggregated grouping of hardware components. By way of example only, the following commercially available software products could exist in a software asset catalogue: object storage software (e.g., Atmos, Centera, ViPR); file system software (e.g., VNX, VNXe, Isilon); block storage software (e.g., ScaleIO, VMAX, VNX); database software (e.g., Greenplum); network software (e.g., Nicira, NCX); and hypervisors (e.g. VMware, Hyper-V); backup and recovery software (e.g., Avamar, and Networker); mobility software (e.g., VPLEX); deduplication software (e.g., DataDomain); and replication software (e.g., RecoverPoint).

In one embodiment, for each software asset in the catalogue, an application programming interface (API) is provided to report, to software trust monitor 620, the trust characteristics 654 that are enabled by that individual software package. The monitor can alternatively request the trust characteristics. For example, when querying an asset in the catalogue that happens to be a Centera object storage system, this asset would reveal its list of capabilities as follows, e.g.: Retention=TRUE; Event-based retention=TRUE; Immutability=TRUE; Automatic deletion=FALSE; and Electronic Shredding=TRUE. In one embodiment, each asset in the overlay catalogue is programmed to answer TRUE/FALSE for an entire set of trust characteristics 654.

It is to be understood that an application, when deployed to a disaggregated infrastructure, can contain application workload information (e.g., required amount of CPU, memory, disk, etc.) that results in a disaggregated grouping and subsequent overlay. In one embodiment, the application is configured to be accompanied by one or more trust policies 656 (e.g., the need for electronic shredding and memory isolation, etc.). The trust policies are provided to application trust monitor 630. Therefore, when an application is requested to be deployed on top of a disaggregated infrastructure, it not only contains the application workload requirements but also, advantageously, its required trust policies.

In response to a request to deploy an application with its corresponding workload and trust policies, trust overlay controller 540 (e.g., as part of a disaggregated arbiter) searches, via search module 640, for hardware components that satisfy (all or some) of the trust policies (e.g., a bank of CPUs that has the appropriate trust capabilities). This grouping may include trust-enhanced CPUs, memory, disks, etc. That is, module 640 compares the trust policies of the application against the trust characteristics 652 obtained by monitor 610 from the disaggregated components to determine which components satisfy the policies.

Once a set of trust characteristics have been identified in the underlying raw disaggregated hardware components and grouped, there may be a remaining subset of trust policy requirements that were not met by the underlying components (e.g., immutability of data). Trust overlay controller 540 (e.g., as part of a disaggregated arbiter) then searches through the trust characteristics 654 obtained by monitor 620 (and may also search the overlay catalogue 328 itself) in an attempt to identify software overlay trust functionality which satisfies the remaining requested trust policy requirements. Once an overlay is found that satisfies both the workload needs (e.g., the application needs object storage) and the trust needs (e.g., the application needs immutability), the overlay can be deployed on top of the disaggregated infrastructure.

When an overlay with specific trust characteristics gets deployed on top of a disaggregated infrastructure, the trust overlay controller 540 in charge of overlaying the functionality can also specify trust boot settings (e.g., an XML file) that instruct the overlay to enable specific trust settings upon boot up.

The following use case examples illustratively describe how a disaggregated arbiter with a trust overlay controller creates a trusted infrastructure from disaggregated components in response to an application deployment request.

In a hardware-supported disk encryption use case, assume that an application gets deployed to a disaggregated infrastructure and requests disk encryption. The disaggregated arbiter (with trust overlay controller functionalities as described herein) consults the current disaggregated hardware components and identifies a rack of disks that support full-drive encryption, and allocates the appropriate disks from the infrastructure and dedicates it to the application.

In a software-supported disk encryption use case, assume an application gets deployed to a disaggregated infrastructure and requests disk encryption. The disaggregated arbiter (with trust overlay controller functionalities as described herein) scans the raw hardware components and recognizes that there is no disk encryption capability in the raw hardware. The disaggregated arbiter then consults the block storage overlays in the overlay catalogue and finds that ScaleIO does not support drive encryption but locates a VNXe image that does provide the needed support. The disaggregated arbiter deploys the VNXe image on top of the grouped raw disk components and deploys the predetermined boot settings to run in an encrypted mode.

In an immutable object storage use case, assume that, in response to an application requesting to store objects that can never be overwritten, the disaggregated arbiter (with trust overlay controller functionalities as described herein) scans the configuration of disaggregated disks and determines that there is no immutability support in the hardware. Subsequently, the disaggregated arbiter searches for object storage capability in the overlay catalogue. The arbiter can then query Atmos to find out if it supports immutability. If no, the arbiter then queries Centera to find out if it supports immutability. If yes, the Centera overlay is pulled from the catalogue and deployed on top of the disaggregated infrastructure.

Figure 7:
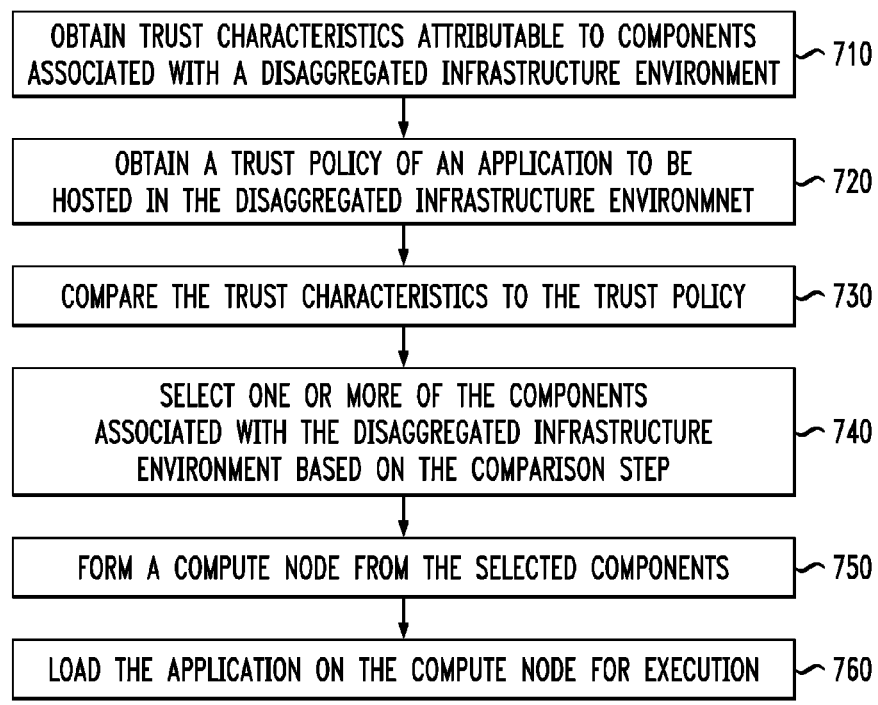
FIG. 7 illustrates a methodology for implementing trust overlay functionalities for disaggregated infrastructure, according to an embodiment of the invention.

FIG. 7 illustrates a methodology 700 for implementing trust overlay functionalities for disaggregated infrastructure, according to an embodiment of the invention. More particularly, step 710 obtains trust characteristics attributable to components associated with a disaggregated infrastructure environment (e.g., disaggregated hardware components and software overlays). Step 720 obtains a trust policy of an application to be hosted in the disaggregated infrastructure environment. Step 730 compares the trust characteristics to the trust policy. Step 740 selects one or more of the components associated with the disaggregated infrastructure environment based on the comparison performed in step 730. Step 750 forms a compute node from the selected components. Step 760 loads the application on the compute node for execution.

Figure 8:
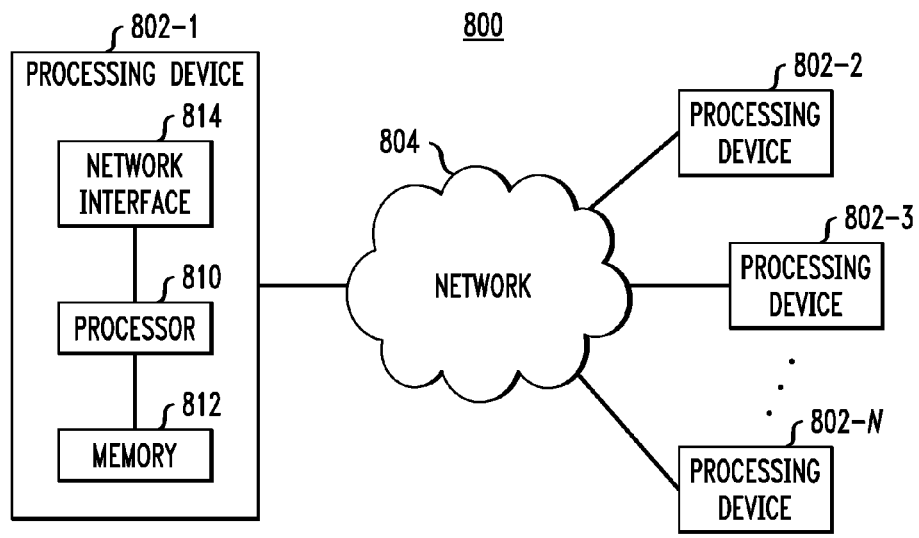
FIG. 8 illustrates a processing platform used to implement a disaggregated infrastructure system with trust overlay functionalities, according to an embodiment of the invention.

As an example of a processing platform on which a disaggregated infrastructure system with trust overlay functionalities (e.g., systems shown in FIGS. 5 and 6) can be implemented is processing platform 800 shown in FIG. 8. The processing platform 800 in this embodiment comprises a plurality of processing devices, denoted 802-1, 802-2, 802-3, . . . 802-N, which communicate with one another over a network 804. It is to be appreciated that the trust overlay methodologies described herein may be executed in one such processing device 802, or executed in a distributed manner across two or more such processing devices 802. A cloud infrastructure environment may also be executed in a distributed manner across two or more such processing devices 802. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 8, such a device generally comprises at least one processor and an associated memory, and implements one or more functional modules for instantiating and/or controlling features of systems and methodologies described herein. Multiple elements or modules may be implemented by a single processing device in a given embodiment.

The processing device 802-1 in the processing platform 800 comprises a processor 810 coupled to a memory 812. The processor 810 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 810. Memory 812 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 812 may comprise electronic memory such as random access memory (RAM), read-only memory (ROM) or other types of memory, in any combination. The one or more software programs when executed by a processing device such as the processing device 802-1 causes the device to perform functions associated with one or more of the components/steps of system/methodologies in FIGS. 1-7. One skilled in the art would be readily able to implement such software given the teachings provided herein. Other examples of processor-readable storage media embodying embodiments of the invention may include, for example, optical or magnetic disks.

Processing device 802-1 also includes network interface circuitry 814, which is used to interface the device with the network 804 and other system components. Such circuitry may comprise conventional transceivers of a type well known in the art.

The other processing devices 802 (802-2, 802-3, . . . 802-N) of the processing platform 800 are assumed to be configured in a manner similar to that shown for computing device 802-1 in the figure.

The processing platform 800 shown in FIG. 8 may comprise additional known components such as batch processing systems, parallel processing systems, physical machines, virtual machines, virtual switches, storage volumes, etc. Again, the particular processing platform shown in this figure is presented by way of example only, and the system environments respectively shown may include additional or alternative processing platforms, as well as numerous distinct processing platforms in any combination.

Also, numerous other arrangements of servers, clients, computers, storage devices or other components are possible in processing platform 800. Such components can communicate with other elements of the processing platform 800 over any type of network, such as a wide area network (WAN), a local area network (LAN), a satellite network, a telephone or cable network, or various portions or combinations of these and other types of networks.

Furthermore, it is to be appreciated that the processing platform 800 of FIG. 8 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 800 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 800 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the system environments described herein may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:

obtaining trust characteristics attributable to components associated with a disaggregated infrastructure environment, wherein the components for which trust characteristics are obtained comprise one or more disaggregated hardware components and one or more software overlays;

obtaining a trust policy of an application to be hosted in the disaggregated infrastructure environment;

comparing the trust characteristics to the trust policy;

selecting one or more of the components associated with the disaggregated infrastructure environment for which trust characteristics are obtained based on the comparison step;

forming a compute node from the selected components comprising provisioning one or more of the selected disaggregated hardware components;

overlaying one or more of the selected software overlays on the one or more provisioned disaggregated hardware components; and specifying one or more trust boot settings that instruct the one or more overlaid software overlays to enable specific trust settings upon boot up; and loading the application on the compute node for execution.

2. The method of claim 1, wherein the comparison step determines whether or not one or more of the trust characteristics of the components satisfy one or more portions of the trust policy such that the selected components are one or more components associated with the disaggregated infrastructure environment that have trust characteristics that satisfy the one or more portions of the trust policy.

3. The method of claim 1, wherein the trust characteristics are obtained by at least one of actively requesting trust characteristics from a given component and passively receiving trust characteristics from a given component.

4. The method of claim 1, wherein the trust policy is obtained as part of an application provisioning request.

5. The method of claim 1, wherein at least a portion of the trust characteristics associated with a given software overlay are obtained via an application programming interface associated with the given software overlay.

6. An article of manufacture comprising a processor-readable storage medium having encoded therein executable code of one or more software programs, wherein the one or more software programs when executed by one or more processing devices implement steps of claim 1.

7. The method of claim 1, wherein the disaggregated infrastructure environment includes a disaggregated infrastructure manager, disaggregated resource pools, and a disaggregated infrastructure.

8. An apparatus comprising:

a memory; and a processor operatively coupled to the memory and configured to:

obtain trust characteristics attributable to components associated with a disaggregated infrastructure environment, wherein the components for which trust characteristics are obtained comprise one or more disaggregated hardware components and one or more software overlays;

obtain a trust policy of an application to be hosted in the disaggregated infrastructure environment;

compare the trust characteristics to the trust policy;

select one or more of the components associated with the disaggregated infrastructure environment for which trust characteristics are obtained based on the comparison step;

form a compute node from the selected components comprising provision one or more of the selected disaggregated hardware components;

overlay one or more of the selected software overlays on the one or more provisioned disaggregated hardware components; and specify one or more trust boot settings that instruct the one or more overlaid software overlays to enable specific trust settings upon boot up; and load the application on the compute node for execution.

9. The apparatus of claim 8, wherein, in comparing the trust characteristics to the trust policy, the processor is configured to determine whether or not one or more of the trust characteristics of the components satisfy one or more portions of the trust policy such that the one or more selected components are one or more components associated with the disaggregated infrastructure environment that have trust characteristics that satisfy the one or more portions of the trust policy.

10. The apparatus of claim 8, wherein the trust characteristics are obtained by at least one of actively requesting trust characteristics from a given component and passively receiving trust characteristics from a given component.

11. The apparatus of claim 8, wherein the trust policy is obtained as part of an application provisioning request.

12. The apparatus of claim 8, wherein at least a portion of the trust characteristics associated with a given software overlay are obtained via an application programming interface associated with the given software overlay.

13. The apparatus of claim 8, wherein the one or more disaggregated hardware components and the one or more software overlays are also selected based on an anticipated workload associated with execution of the application.

14. A system comprising:

a disaggregated infrastructure environment comprising one or more disaggregated hardware components;

a software catalogue comprising one or more software overlays;

a disaggregated infrastructure manager configured to: obtain trust characteristics attributable to at least a portion of the one or more disaggregated hardware components; obtain a trust policy of an application to be hosted in the disaggregated infrastructure environment; compare the trust characteristics to the trust policy; select one or more of the disaggregated hardware components having trust characteristics that satisfy one or more portions of the trust policy based on the comparison; form a compute node from one or more of the selected disaggregated hardware components; and load the application on the compute node for execution;

wherein the disaggregated infrastructure manager is further configured to obtain trust characteristics attributable to at least a portion of the one or more software overlays and, in response to a determination that at least one portion of the trust policy remains unsatisfied after the selection of the disaggregated hardware components, select one or more of the software overlays having trust characteristics that satisfy at least one remaining portion and overlay one or more of the selected software overlays on the one or more selected disaggregated hardware components, wherein the disaggregated infrastructure manager is further configured to instruct the one or more overlaid software overlays to enable specific trust settings upon boot up.

15. The system of claim 14, wherein the one or more disaggregated hardware components and the one or more software overlays are also selected based on an anticipated workload associated with execution of the application.

16. The system of claim 14, wherein in comparing the trust characteristics to the trust policy determines whether or not one or more of the trust characteristics of the components satisfy one or more portions of the trust policy such that the selected components are one or more components associated with the disaggregated infrastructure environment that have trust characteristics that satisfy the one or more portions of the trust policy.

17. The system of claim 14, wherein the trust characteristics are obtained by at least one of actively requesting trust characteristics from a given component and passively receiving trust characteristics from a given component.

18. The system of claim 14, wherein the trust policy is obtained as part of an application provisioning request.

19. The system of claim 14, wherein at least a portion of the trust characteristics associated with a given software overlay are obtained via an application programming interface associated with the given software overlay.

20. The system of claim 14, wherein the one or more disaggregated hardware components and the one or more software overlays are also selected based on an anticipated workload associated with execution of the application.

* * * * *